(12) United States Patent
Kyosti et al.

(10) Patent No.: US 11,108,474 B2
(45) Date of Patent: Aug. 31, 2021

(54) SYSTEMS AND METHODS FOR TESTING A WIRELESS DEVICE HAVING A BEAMFORMING CIRCUIT

(71) Applicant: Keysight Technologies, Inc., Santa Rosa, CA (US)

(72) Inventors: Pekka Kyosti, Oulu (FI); Jukka Kyrolainen, Oulu (FI)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 16/525,894

(22) Filed: Jul. 30, 2019

(65) Prior Publication Data

US 2019/0356396 A1    Nov. 21, 2019

Related U.S. Application Data

(62) Division of application No. 15/844,044, filed on Dec. 15, 2017, now Pat. No. 10,505,646.

(51) Int. Cl.
*H04B 17/15* (2015.01)
*H04B 7/0413* (2017.01)
*H04B 7/06* (2006.01)

(52) U.S. Cl.
CPC ........... *H04B 17/15* (2015.01); *H04B 7/0413* (2013.01); *H04B 7/0617* (2013.01)

(58) Field of Classification Search
CPC ...................................................... H04B 17/15

(Continued)

(56) References Cited

U.S. PATENT DOCUMENTS 5,463,317 A   10/1995   Murphy
5,892,482 A   4/1999   Coleman, Jr. et al.
(Continued)

FOREIGN PATENT DOCUMENTS

CN   101038313 A   9/2007
CN   101500254 A   8/2009
(Continued)

OTHER PUBLICATIONS

Non-Final Office Action dated Mar. 8, 2018, for U.S. Appl. No. 15/254,414, 33 pgs.
(Continued)

*Primary Examiner* — Lihong Yu (57) ABSTRACT

Systems and methods for testing a wireless device having a beamforming circuit are disclosed herein. An exemplary system includes a shielded test enclosure, a wireless channel emulator, and a test instrument. The shielded test enclosure provides a cable-free connection between the wireless device and the wireless channel emulator, thereby allowing for testing of various types of wireless devices, particularly those that do not have radio-frequency (RF) connectors. The shielded test enclosure is smaller in size and less-expensive than traditional multi-probe anechoic chambers. In one example application, the shielded test enclosure is used to house a multiple-input multiple-output (MIMO) antenna array of a wireless device and a probe antenna array. The probe antenna array is coupled to the wireless channel emulator and used to receive signals from MIMO antenna arrays of various sizes thereby eliminating the need to uniquely tailor the probe antenna array to any specific MIMO antenna array.

16 Claims, 6 Drawing Sheets

(58) Field of Classification Search
USPC .......................................................... 375/240
See application file for complete search history.

(56) References Cited

U.S. PATENT DOCUMENTS

| | | | |
|---|---|---|---|
| 8,718,122 B2 | 5/2014 | Griesing et al. | |
| 9,742,508 B1 | 8/2017 | Kyosti et al. | |
| 9,923,647 B1* | 3/2018 | Olgaard | H04B 17/12 |
| 2006/0229018 A1 | 10/2006 | Mlinsarsky et al. | |
| 2006/0229020 A1 | 10/2006 | Mlinarsky et al. | |
| 2007/0243836 A1 | 10/2007 | Liu | |
| 2008/0056340 A1* | 3/2008 | Foegelle | H04B 17/29 375/224 |
| 2008/0114580 A1 | 5/2008 | Chin et al. | |
| 2011/0084887 A1 | 4/2011 | Mow et al. | |
| 2011/0200084 A1 | 8/2011 | Griesing et al. | |
| 2011/0299570 A1 | 12/2011 | Reed | |
| 2012/0275506 A1 | 11/2012 | Ding et al. | |
| 2012/0282863 A1 | 11/2012 | Guo et al. | |
| 2012/0309323 A1 | 12/2012 | Guo et al. | |
| 2013/0027256 A1 | 1/2013 | Guo et al. | |
| 2014/0024318 A1 | 1/2014 | Sevindik et al. | |
| 2014/0141728 A1 | 5/2014 | Devarasetty et al. | |
| 2015/0017928 A1 | 1/2015 | Griesing et al. | |
| 2016/0212641 A1 | 7/2016 | Kong et al. | |
| 2016/0233970 A1 | 8/2016 | Reed | |
| 2016/0269983 A1* | 9/2016 | Islam | H04W 8/00 |
| 2016/0285572 A1 | 9/2016 | Manghal et al. | |
| 2016/0344490 A1 | 11/2016 | Foegelle | |
| 2017/0184698 A1 | 6/2017 | Rueth | |
| 2017/0207843 A1 | 7/2017 | Jung et al. | |
| 2017/0373773 A1 | 12/2017 | Jing et al. | |
| 2018/0034531 A1* | 2/2018 | Sadiq | H04W 76/10 |
| 2018/0041936 A1 | 2/2018 | Kim et al. | |
| 2018/0048399 A1 | 2/2018 | Thiruvarankan | |
| 2018/0062971 A1 | 3/2018 | Kyosti et al. | |
| 2019/0074913 A1* | 3/2019 | Liang | H04B 17/0087 |

FOREIGN PATENT DOCUMENTS

| | | |
|---|---|---|
| CN | 102136873 A | 7/2011 |
| WO | 2011148030 A1 | 12/2011 |
| WO | 2013169324 A1 | 11/2013 |

OTHER PUBLICATIONS

Yu et al., "Radiated Two-Stage Method for LTE MIMO User Equipment Performance Evaluation," IEEE Transactions on Electromagnetic Compatibility, vol. 56, Dec. 2014, pp. 1691-1696 (Year: 2014).
Notice of Allowance dated May 23, 2018, U.S. Appl. No. 15/721,757, 20 pgs.
Soon-Soo Oh et al., "Antenna Measurement Method in Fresnel Region by θ-Variation Scanning", IEEE Antennas and Wireless Propagation Letters, vol. 7, 2008, pp. 206-209.
Final Office Action dated Sep. 6, 2018, U.S. Appl. No. 15/254,414, 16 pgs.
Advisory Action dated Nov. 27, 2018, U.S. Appl. No. 15/254,414, 4 pgs.
Non-Final Office Action dated Feb. 15, 2019, U.S. Appl. No. 15/254,414, 16 pgs.
Notice of Allowance dated Jul. 30, 2019, U.S. Appl. No. 15/844,044, 9 pgs.
Notice of Allowance dated Jul. 31, 2019, for U.S. Appl. No. 15/254,414, 13 pgs.
Notice of Allowance dated Nov. 21, 2019, for U.S. Appl. No. 15/254,414, 12 pgs.
Chinese Office Action and Search Report dated Jan. 20, 2021, 8 pgs.
English translation of Chinese Office Action and Search Report, 7 pgs.

* cited by examiner

SYSTEMS AND METHODS FOR TESTING A WIRELESS DEVICE HAVING A BEAMFORMING CIRCUIT

CROSS-REFERENCE TO RELATED APPLICATIONS

The present application is a divisional application of U.S. patent application Ser. No. 15/844,044 under 35 U.S.C. § 120 to Pekka Kyosti, et al., and filed on Dec. 15, 2017. The entire disclosure of patent application Ser. No. 15/844,044 is specifically incorporated by reference herein.

BACKGROUND

Wireless devices have become ubiquitous in our daily lives. For example, it is hard for an average person to spend a day without using a cellphone. The proliferation of such wireless devices places a continuously increasing demand for bandwidth and services. The increase in bandwidth is typically obtained by using higher and higher frequencies such as evidenced by the evolution of the third-generation (3G) wireless industry standard into the fourth-generation (4G) wireless industry standard and the fifth-generation (5G) wireless industry standard. The increase in frequency bandwidths is typically accompanied by changes in hardware, particularly in terms of a reduction in size of the wireless device.

The reduction in size is achieved at least in part, by eliminating radio frequency (RF) connectors in the wireless device. However, eliminating RF connectors in the wireless device presents a challenge when the wireless device has to be tested either during manufacture or later on during use. One traditional solution for testing a wireless device involves placing the wireless device in a multi-probe anechoic chamber (MPAC) and conducting over-the-air tests of the wireless device inside the MPAC. Typical MPAC chambers are expensive and large in size. For example, an MPAC used to test a Long Term Evolution (LTE) base station or a wireless user equipment (UE) may require over 100 square meters of floor space and can be very expensive. It is therefore desirable to provide smaller and more cost-effective test systems that can be used for testing wireless devices.

BRIEF DESCRIPTION OF THE FIGURES

Many aspects of the invention can be better understood by referring to the following description in conjunction with the accompanying claims and figures. Like numerals indicate like structural elements and features in the various figures. For clarity, not every element may be labeled with numerals in every figure. The drawings are not necessarily drawn to scale; emphasis instead being placed upon illustrating the principles of the invention. The drawings should not be interpreted as limiting the scope of the invention to the example embodiments shown herein.

DETAILED DESCRIPTION

Throughout this description, embodiments and variations are described for the purpose of illustrating uses and implementations of inventive concepts. The illustrative description should be understood as presenting examples of inventive concepts, rather than as limiting the scope of the concepts as disclosed herein. Towards this end, certain words and terms are used herein solely for convenience and such words and terms should be broadly understood as encompassing various objects and actions that are generally understood in various forms and equivalencies by persons of ordinary skill in the art. For example, it should be understood that the word "coupled" as used herein may indicate in one context a communicative coupling between two elements such as signals being transferred (wirelessly or through a wired medium) from one element to another, and in a different context may indicate a mechanical connection such as a coaxial cable between two elements. As another example, the word "propagate" as used herein generally refers to the passage of a signal through an object or through free space. As yet another example, the phrase "configured to" as used herein generally indicates refers to an object having a physical structure and/or capability to execute an action that is described in the context of the phrase. It should also be understood that words such as "example" and "exemplified" as used herein are intended to be non-exclusionary and non-limiting in nature. More particularly, the word "exemplary" as used herein indicates one among several examples and it should be understood that no special emphasis, exclusivity, or preference, is associated or implied by the use of this word. Furthermore, it may be pertinent to point out that even though certain examples provided below for purposes of description may indicate signal propagation in a right to left direction through various elements, it should be understood that the description may apply equally well for signal propagation in a left to right direction through these elements.

Generally, in accordance with the various illustrative embodiments disclosed herein, a system for testing a wireless device having a beamforming circuit includes a shielded test enclosure, a wireless channel emulator, and a test instrument. The shielded test enclosure provides a cable-free connection between the wireless device and the wireless channel emulator, thereby allowing for testing of various types of wireless devices, particularly those that do not have radio-frequency (RF) connectors. The shielded test enclosure is smaller in size and less-expensive than traditional multi-probe anechoic chambers. The smaller size can be attributed to various factors such as a higher frequency of operation of wireless devices and elimination of certain items such as RF absorbing material. In one example application, the shielded test enclosure is used to house a multiple-input multiple-output (MIMO) antenna array of a wireless device and a probe antenna array. The probe antenna array is coupled to the wireless channel emulator and used to receive signals from MIMO antenna arrays of various sizes thereby eliminating the need to uniquely tailor the probe antenna array to any specific MIMO antenna array.

Figure 1:
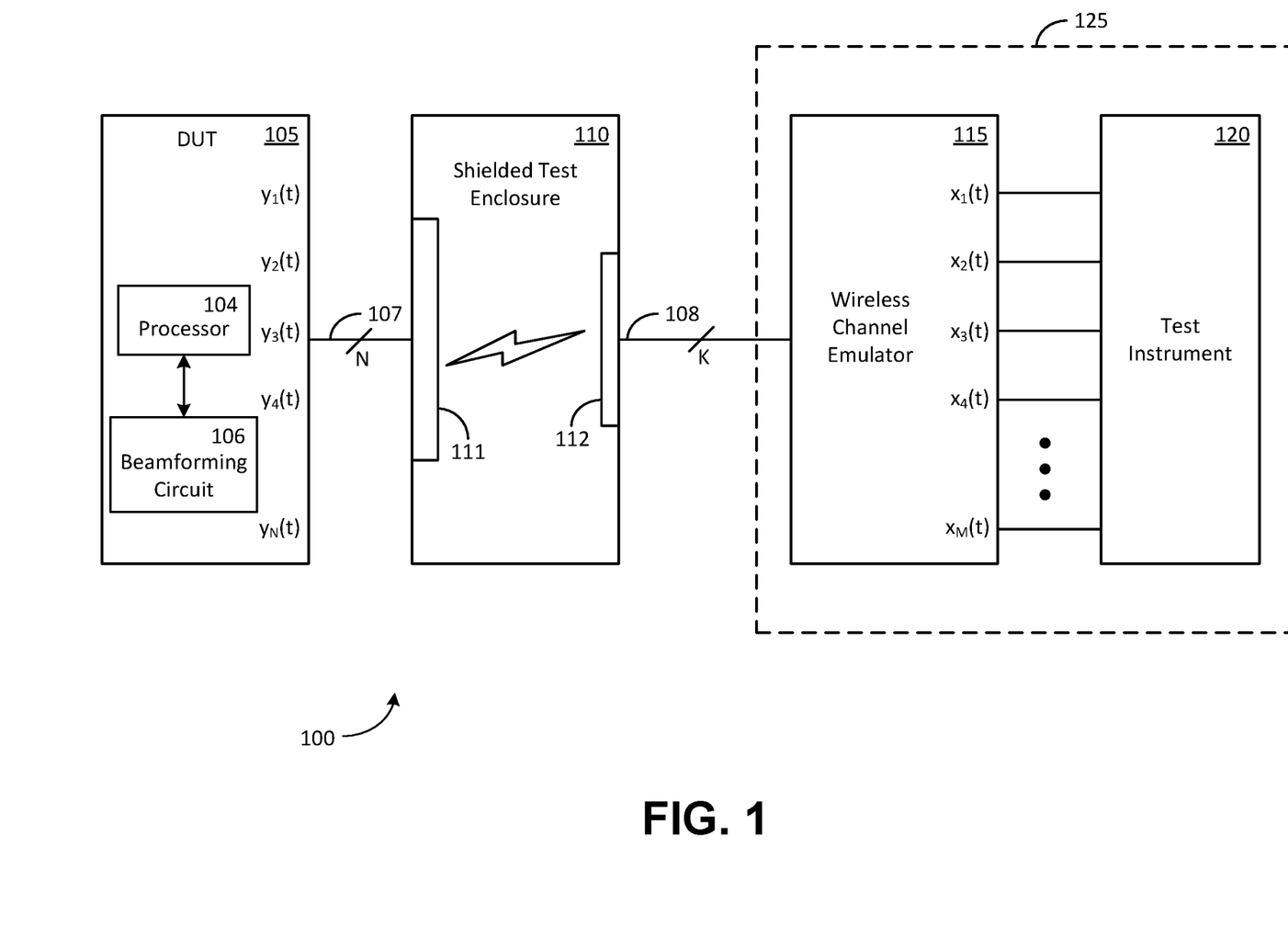
FIG. 1 shows an exemplary test system that includes a shielded test enclosure which provides a cable-free connection between a device under test and a wireless channel emulator in accordance with an exemplary embodiment of the present disclosure.

FIG. 1 shows an exemplary test system 100 that includes a shielded test enclosure 110, a device under test (DUT) 105 and a wireless channel emulator 115. The shielded test enclosure 110 provides a cable-free connection between the DUT 105 and the wireless channel emulator 115 in accordance with various exemplary embodiments of the present disclosure. The DUT 105 can be any of various types of wireless devices such as a personal communications device, a communications device used by a service provider, and a consumer entertainment device. An example of a personal communications device is a cellular device such as a smartphone. Some examples of communications devices used by service providers include a Long Term Evolution (LTE) base station, a wireless user equipment (UE), or various other types of communication devices operating in the mm wavelength region. Some examples of consumer entertainment devices include a Sony Playstation® or a Microsoft XBox®.

The test instrument 120 can be any of various types of test instruments such as a Keysight Wireless Communications Test set or a Keysight Performance Vector Signal Analyzer for example. In some exemplary implementations, the test instrument 120 can be a LTE base station or UE, a 5G base station or UE, or any other device operating in the mm wavelength region. The DUT 105 can be a communication device that is configured to communicate with the test instrument 120 for executing various types of tests to evaluate performance characteristics of the test instrument 120 (the LTE base station or UE). In some other exemplary implementations, the test instrument 120 initiates a test procedure by communicating with the DUT 105 for testing the DUT 105. In some other exemplary implementations, the DUT 105 can initiate a self-test procedure and use the test instrument 120 for carrying out a self-test of the DUT 105. The test procedures may be executed for evaluating various downlink and uplink performance characteristics of the DUT 105 such as downlink and uplink throughput performance, downlink and uplink signal characteristics, and for evaluating baseband parameters.

The DUT 105 includes a beamforming circuit 106 that is used to provide a radio frequency signal to an antenna array such as a MIMO antenna array 111 placed inside the shielded test enclosure 110. In some cases, the MIMO antenna array 111 is an integral part of a housing of the DUT 105 and as such the DUT 105 is placed inside the shielded test enclosure 110. In some other cases, the MIMO antenna array 111 is an independent component that is placed in the shielded test enclosure 110 and coupled to the DUT 105 via a set of "N" communication links 107.

A processor 104 is coupled to the beamforming circuit 106 and used to configure the beamforming circuit 106 to provide drive signals to the MIMO antenna array 111. The drive signals are typically generated in the beamforming circuit 106 by using beamforming techniques involving the use of two variables: amplitude and phase. The combination of these two variables is used to improve sidelobe suppression and/or steering nulls so as to configure the MIMO antenna array 111 to radiate a directional RF signal.

The various beamforming techniques that may be used by the beamforming circuit 106 includes analog beamforming, digital beamforming, and hybrid beamforming. The beamforming circuit 106 will accordingly correspond to an analog beamforming circuit, a digital beamforming circuit, or a hybrid beamforming circuit. Analog beamforming typically involves the use of multiple analog phase shifters and multiple RF switches coupled to an RF signal chain. While the hardware can be inexpensive, implementing a multi-stream RF transmission with analog beamforming can be a highly complex procedure. Digital beamforming addresses some of the shortcomings associated with analog beamforming by using multiple RF signal chains and digital processing techniques for phase adjustments. However, digital beamforming may not necessarily be the most suitable for use in some applications due to factors such as high complexity, high cost, and high energy consumption (particularly in consumer devices such as cellphones). Hybrid beamforming is a proposed solution that combines advantages of analog beamforming and digital beamforming while addressing certain shortcomings such as complexity and cost.

In the exemplary test system 100 shown in FIG. 1, the DUT 105 is located outside the shielded test enclosure 110 and the set of "N" communication links 107 used to couple "N" drive signals from the DUT 105 to the MIMO antenna array 111 that is placed inside the shielded test enclosure 110. The "N" RF signals radiated by the MIMO antenna array 111 are received by a probe antenna array 112 that is also located inside the shielded test enclosure 110.

In accordance with various embodiments of the disclosure, the shielded test enclosure 110 provides a cable-free connection between the DUT 105 and the wireless channel emulator 115. The cable-free connection eliminates the need to have RF connectors provided on the DUT 105 for test purposes. Furthermore, the number of antenna elements "K" (where K≥N) that are installed in the probe antenna array 112 can be large enough to accommodate various types of DUTs and only a sub-set of the "K" antenna elements may be used to receive signals from MIMO antenna arrays of various sizes, thereby eliminating the need to alter the number of antenna elements of the probe antenna array 112 to match a specific MIMO antenna array.

Thus, in a first exemplary application, the DUT 105 may be a device that utilizes only 2 beam states simultaneously at any given moment in time and in a second exemplary application the DUT 105 may be a device that utilizes 8 beam states simultaneously at any other given moment in time. The probe antenna array 112 is thus agnostic to the type of MIMO antenna array used and operates in a beam domain (based on beam states) rather than in an antenna element domain (based on number of antenna elements) in accordance with various embodiments of the disclosure.

A traditional test system operating in the antenna element domain would typically embody a 1:1 ratio between the number of antenna elements of an antenna array that is a part of a device under test and the number of antenna elements of a probe antenna array. The 1:1 ratio would also be applicable between the number of antenna elements of the probe antenna array and the number of channels used by the wireless channel emulator coupled to the probe antenna array.

The use of beam domain techniques not only allows for a reduction in size and cost of the shielded test enclosure 110 by using a ratio other than 1:1 but may also reduce complexity and cost of the wireless channel emulator 115 in comparison to traditional practice. The reduction in the number of emulator channels also translates to a reduction in processing requirements on the wireless channel emulator 115 in comparison to traditional wireless channel emulators.

The dimensions of the shielded test enclosure 110 is significantly smaller than a traditional MPAC. For example, when the DUT 105 is a device that operates at approximately 2.6 GHz, the inside dimensions of the shielded test enclosure 110 are approximately 0.3×0.52×0.52 meters. An additional 0.2 meters may be reserved for RF absorbing material if used on the inside the shielded test enclosure 110 (though not required). The overall dimension of the shielded test enclosure is thus equal to 110 to 0.7×0.92×0.92 meters or approximately 0.6 cubic meters. For higher test frequencies the dimensions may be reduced even more. The probe antenna array 112 is automatically located in a near field region (i.e. Fresnel region) of the MIMO antenna array 111 due to the small dimensions of the shielded test enclosure 110. However, in other embodiments, the dimensions of the shielded test enclosure 110 may be expanded to allow the probe antenna array 112 to be placed in a far field region of the MIMO antenna array 111 when power levels of the signals transmitted by the MIMO antenna array 111 are higher.

The wireless channel emulator 115, which can also be referred to as a fading emulator, is coupled to the probe antenna array 112 via a set of "K" communication links 108 and is used to emulate the cable-free connection between the MIMO antenna array 111 and the probe antenna array 112. The wireless channel emulator 115 is also coupled to the test instrument 120 to provide to the test instrument 120 "M" emulator channels ($x_1(t)$, through $x_M(t)$) at various instants in time. Operations and functionalities of these "M" emulator channels are described below in further detail. In some exemplary embodiments, the wireless channel emulator 115 and the test instrument 120 may be housed inside a single enclosure 125. When housed inside the single enclosure 125, some of the functionalities of the wireless channel emulator 115 and the test instrument 120 may be executed by shared components such as a processor or a memory.

Figure 2:
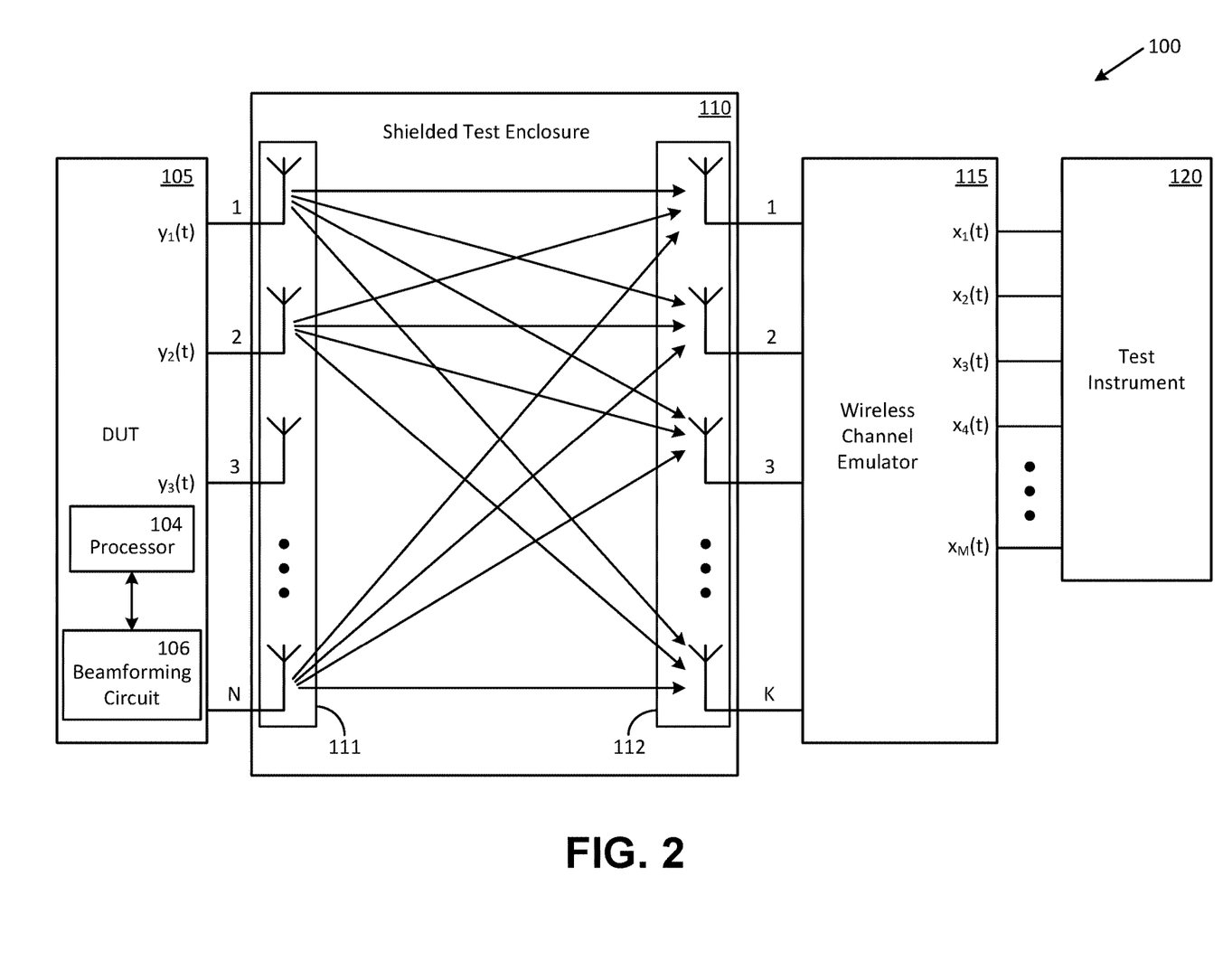
FIG. 2 illustrates radio frequency signal paths inside the shielded test enclosure shown in FIG. 1.

FIG. 2 illustrates radio frequency signal paths inside the shielded test enclosure 110 between the MIMO antenna array 111 and the probe antenna array 112. The MIMO antenna array 111 is used by the DUT 105 to transmit "N" signals towards the probe antenna array 112. The "N" signals carried by the "N" beams of the MIMO antenna array 111 are received by each of "K" antenna elements of the probe antenna array 112 and coupled into the wireless channel emulator 115.

The wireless channel emulator 115 emulates the radio frequency signal paths by generating emulated MIMO channel models. Towards this end, the wireless channel emulator 115 determines a set of transfer functions between the MIMO antenna array 111 and the probe antenna array 112 and optimizes various calibration matrices to be applied to various beam indices. The calibration matrices are then applied to emulate the cable-free connections between the MIMO antenna array 111 and the probe antenna array 112 in real-time by utilizing the various beam indices for transmitting signals between the MIMO antenna array 111 and the probe antenna array 112. The emulated cable-free connections establish conditions for an emulated MIMO channel model that can be utilized when measuring downlink and/or uplink throughput performance of the DUT 105 for example and the wireless channel emulator 115 can be viewed as a time-variant filter that convolves an input signal by using channel impulse responses of the MIMO channel model.

Figure 3:
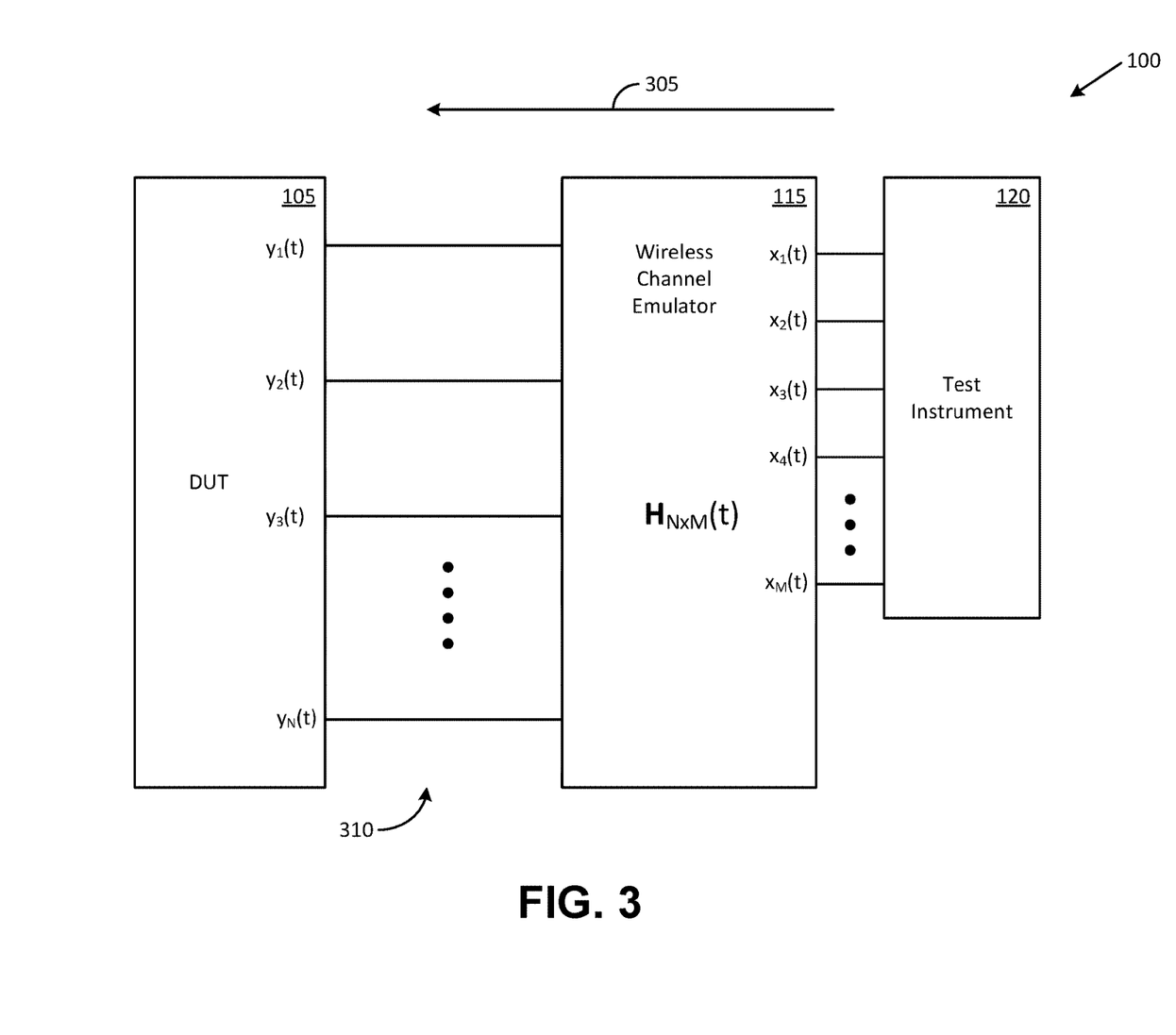
FIG. 3 shows a symbolic representation of an exemplary test system wherein the cable-free connection provided by the shielded test enclosure is hypothetically replaced with cables.
Figure 4:
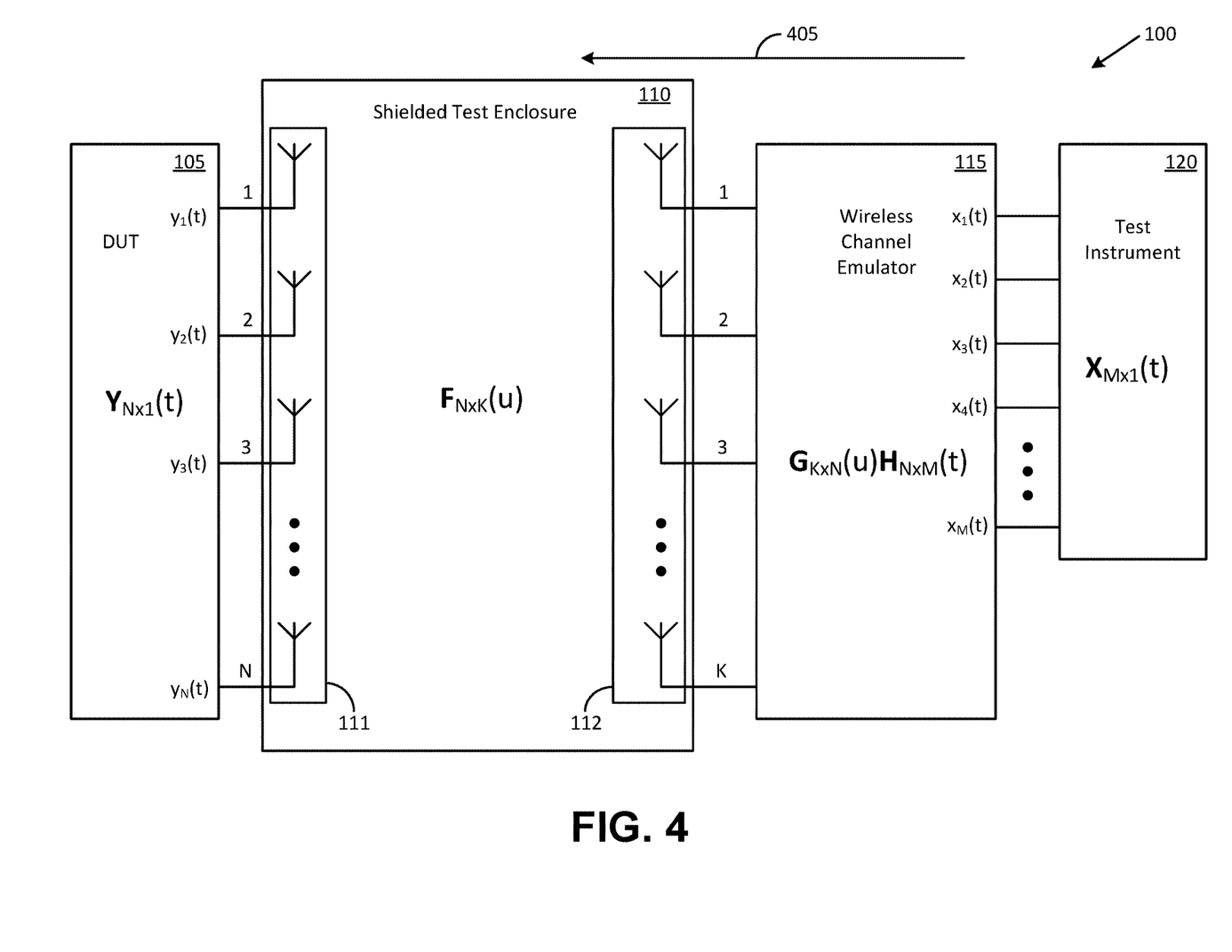
FIG. 4 shows a symbolic representation of an exemplary test system that includes the shielded test enclosure in accordance with an exemplary embodiment of the present disclosure.

FIG. 3 shows a symbolic representation of the exemplary test system 100 if the cable-free connection provided by the shielded test enclosure 110 were hypothetically replaced with a set of cables 310. On the other hand, FIG. 4 shows a symbolic representation of the exemplary test system 100 with the shielded test enclosure 110 providing cable-free connections in accordance with various embodiments of the disclosure.

In the symbolic representation shown in FIG. 3, the test instrument 120, which may be a user equipment (UE) or a cellular base station, executes a test procedure by transmitting signals via the wireless channel emulator 115 to the shielded test enclosure 110 (as indicated by signal path 305). In one exemplary implementation, the signals are transmitted using one fixed beam state per port for all time instants. In another exemplary implementation, the signals are transmitted using multiple beam states at various time instants. The DUT 105 receives the signals from the shielded test enclosure 110 and responds by transmitting signals back towards the test instrument 120. For purposes of description, the signals transmitted by the test instrument 120 to the DUT 105 are referred to in this example as uplink signals, and signals transmitted by the DUT 105 to the test instrument 120 are referred to as downlink signals.

The wireless channel emulator 115 convolves signals $x_1(t)$ through $x_M(t)$ that are provided by the test instrument 120, by using channel impulse responses $h(t, \tau)$. The convolved signals $y_1(t)$ through $y_N(t)$ are coupled into the DUT 105 via the shielded test enclosure 110. The system functionality can be represented by the following equation:

$$y_n(t) = \sum_m h_{nm}(t, \tau) * x_m(t) \qquad (1)$$

where n=1, 2 . . . N and m=1, 2 . . . M.

If the delay and/or frequency domain attributes were to be neglected for purposes of notational simplicity, Equation (1) can be rewritten as follows:

$$Y_{N \times 1}(t) = H_{N \times M}(t) X_{M \times 1}(t) \qquad (2)$$

where "H" represents a time-variant MIMO channel impulse response (CIR) for "M" transmitters and "N" receivers. Equation (2) defines the manner by which the wireless channel emulator 115 would represent the interconnection between the wireless channel emulator 115 and the DUT 105 using the set of cables 310.

In contrast, the cable-free connection provided by the shielded test enclosure 110 shown in FIG. 4, can be embodied by the following equation (signal flow indicated by signal path 405):

$$Y_{N \times 1}(t) = F_{N \times K}(u) G_{K \times N}(u) H_{N \times M}(t) X_{M \times 1}(t) \qquad (3)$$

where $F_{N \times K}(u)$ represents one of a time-variant transfer function or a time-invariant transfer function of the shielded test enclosure 110 and $G_{K \times N}(u)$ represents a calibration matrix applied to establish the cable-free connection in accordance with various embodiments of the disclosure. The time-invariant transfer function in a specific version that is applicable when the number of beam states is equal to 1. The calibration matrix is also time variant when the beam states exceeds 1.

Time instant "u" is equal to $$\left\lfloor \frac{t}{T_s} \right\rfloor \in \mathbb{N},$$

where "t" represents time and "$T_S$" is a discrete time step between various beam states and $\lfloor \ \rfloor$ represents a round down (floor) operator. The term G(u)H(t) is a modified emulation parameter pertaining to CIRs for execution by the wireless channel emulator 115. In this exemplary description, matrix F is time-variant because the beamforming circuit 106 uses analog beamforming with each subset of antenna elements of the MIMO antenna array 111 coupled to a corresponding port of the beamforming circuit 106. Accordingly, the DUT 105 can change the beam shape of signals transmitted by the MIMO antenna array 111 in a time-variant manner at each time instant "u".

In an ideal case, the calibration matrix G(u) is determined such that $F(u)G(u)=I_{N\times N} \forall u$. This may not be attainable in practice. Consequently, described below is a test procedure that may be executed on the test system 100 for obtaining an optimal solution.

Step 1.

Place the MIMO antenna array 111 inside the shielded test enclosure 110. The test system 100, particularly the shielded test enclosure 110 coupled to the wireless channel emulator 115, may be calibrated at a center frequency of interest prior to placing the MIMO antenna array 111 inside the shielded test enclosure 110. The center frequency of interest may correspond to a frequency of operation of the DUT 105.

Step 2.

Measure a transfer function $\gamma_{nbk}(f)$ for the $b^{th}$ beam from the $n^{th}$ antenna port of the MIMO antenna array 111 to the $k^{th}$ antenna port of the probe antenna array 112 for each of n=1, 2 ... N, b=1, 2, ... B, k=1, 2, ... K. This operation may be carried out by enabling/disabling antenna ports of the beamforming circuit 106 in the DUT 105, and by sequentially switching all fixed beams supported via each of the antenna ports. In some applications, the DUT 105 may carry out this operation automatically, while in some other cases, a specific test procedure may be executed for this purpose. The transfer function measurement procedure may be carried out for example by enabling a first antenna port of the MIMO antenna array 111, disabling a remaining set of antenna ports of the MIMO antenna array 111, and transmitting a first radio frequency signal from a first antenna port of the MIMO antenna array 111. The transfer function measurement procedure can be similarly repeated for other antenna ports of the MIMO antenna array 111.

Various types of radio frequency test signals can be used for the transfer function measurement procedure. In an exemplary implementation, known pilot signals (such as the cell-specific reference signals in an LTE) are transmitted by the DUT 105 and received and decoded by the wireless channel emulator 115. The following equation is used for composing vectors as a part of the transfer function measurement procedure:

$$\Gamma_{nb} = \{\gamma_{nbk}(f)\}_{k=1,\ldots,K} \in \mathbb{C}^{K \times 1} \quad (4)$$

The measurement of complex transfer functions $\gamma_{nbk}(f)$ can be performed by the wireless channel emulator 115 either once in the beginning of a DUT evaluation test procedure, repetitively during the DUT evaluation test procedure, and/or intermittently during the DUT evaluation test procedure. In one or more exemplary implementations, the transfer function measurement can be performed by exploiting known parameters of signals used by the DUT 105. For example, the wireless channel emulator 115 can down convert and sample downlink signals received from the DUT 105. The down converted and sampled signals can be used for synchronization, detection, and decoding to determine signal parameters present in the downlink signal, followed by estimation of wireless channel transfer functions. The estimation can be performed in various ways such as performed in cellphones by using know pilot tone sequences of the DUT 105.

The pilot tone sequences are typically made orthogonal between the different antenna ports of the DUT 105, for example by transmitting pilot symbols of each antenna port on non-overlapping time-frequency slots. The complete time-frequency wireless channel transfer function for each antenna port can then be extracted by interpolation. In this exemplary embodiment, the measurements are performed at each antenna port k of the probe antenna array 112, and estimation of wireless channel transfer function is performed for each DUT antenna port n and beam b to obtain full set of N×K×B wireless channel transfer functions. Each element (n, k) of the complex transfer function includes the responses of the beamforming circuit 106 and one or more RF chains (not shown) with respect to each beam b of port n; the time-invariant propagation channel between each antenna element n of the MIMO antenna array 111 and antenna element k of the probe antenna array 112; the response of each antenna element k of the probe antenna array 112; cables and switches that may be present between the probe antenna array 112 and the wireless channel emulator 115; and input port RF-chain response of the wireless channel emulator 115.

Where known pilot sequences are not available, the DUT 105 may be configured to transmit a known calibration sequence from each of the antenna ports of the MIMO antenna array 111. In one exemplary implementation, the calibration sequences are transmitted simultaneously via each antenna port of the MIMO antenna array 111 and received simultaneously by the antenna ports of the probe antenna array 112. Simultaneous transmission and reception enables rapid calibration measurement.

Though the transfer functions $\gamma_{nbk}(f)$ are dependent on frequency, an assumption may be made that signal amplitude variations over a frequency bandwidth of interest is negligible, thus allowing for omission of the frequency term henceforth. In one exemplary implementation, where the DUT 105 is a base station with 8 ports (N=8) and the maximum number of beams per port is 56 (B=56), the total number of beams would be N×B=448. If the probe antenna array 112 contains 16 probes (K=16), a total of 7168 transfer function measurements may be carried out (N×B×K=7168).

The dependency of vectors $\Gamma_{nb}$ of Equation (4) and the matrix $F_{N \times K}(u)$ of Equation (3) can be as follows: each time instant "u" of the matrix $F_{N \times K}(u)$ is composed of rows $\Gamma_{nb}$ (n=1, ..., N), where for each row (i.e. each port of the DUT 105) has a specific beam "b" active $F(u)=[\Gamma_{1b_1(u)} \ldots \Gamma_{Nb_N(u)}]^T$.

Step 3.

Perform optimization step for the wireless channel emulator 115. For each port "n" and beam "b" find an optimal weight vector $g_{nb} \in \mathbb{C}^{1 \times K}$ such that the channel gain $|g_{nb}\Gamma_{nb}|$ is maximized and all the other channel gains $|g_{nb}\Gamma_{ij}| \forall i \neq n$, $j \in \{1, \ldots, B\}$ are minimized, i.e.

$$g_{nb} = \arg(\text{maximize}|g_{nb}\Gamma_{nb}|/\text{minimize}|g_{nb}\Gamma_{ij}|\forall i \neq n, j \in \{1,\ldots,B\}). \quad (5)$$

Any suitable optimization method can be utilized. Additional constraints can be set for the optimization, for example, a minimum accepted level $V_1 < |g_{nb}\Gamma_{nb}|$ minimum ratio $$V_2 < \frac{|g_{nb}\Gamma_{nb}|}{|g_{nb}\Gamma_{ij}|} \forall i \neq n,$$

$j \in \{1, \ldots, B\}$. Finally, the determined weight vectors $g_{nb}$ are scaled such that $$|g_{nb}\Gamma_{nb}| = 1 \forall n, b. \tag{6}$$

Step 4.
Get information of the DUT beam index vector $$\beta(u) = [b_1(u), \ldots, b_N(u)] \in \{1, \ldots, B\} \tag{7}$$

for each port "n" at time instant $$u = \left\lfloor \frac{t}{T_s} \right\rfloor \in \mathbb{N},$$

where "t" is time, and Ts is the discrete time step between beam state updates. Different beam states may be defined for each time step "u" or the same beam state may be repeated multiple times depending on the configuration of the test system 100. When DUT 105 is a base station, analog beams can be updated on an orthogonal frequency division multiplexing (OFDM) symbol basis.

The beamforming circuit 106 may use multiple beam states for creating the multiple signals provided to the MIMO antenna array 111. Each of these beam states may be identified by a corresponding "beam index." Thus, equation (7) represents "N" beams that can have "B" beam indices at various instants in time "u". Each "beam state" or "beam index" provides a way to characterize RF signals transmitted by the MIMO antenna array 111.

Step 4 can include two sub-steps:
Sub-Step 4a.
Method for synchronization: The frame/symbol synchronization can be performed by the wireless channel emulator 115 either once in the beginning of a DUT evaluation test procedure, repetitively during the DUT evaluation test procedure, and/or intermittently during the DUT evaluation test procedure. In one or more exemplary implementations, the evaluation test procedure can be performed by exploiting known parameters of signals used by the DUT 105. For example, the wireless channel emulator 115 can down convert and sample downlink signals received from the DUT 105. The down converted and sampled signals can then be used for synchronization, detection, and decoding to determine signal parameters present in the downlink signal, followed by frame and symbol synchronization extraction. In an alternative implementation wherein decoding of beam state information is not required, it is possible to synchronize via a trigger signal transmitted by the DUT 105 and/or the test instrument 120.
Sub-Step 4b.
Alternative methods for acquiring beam state information:
1. Known Fixed Beam Sequence:
The beam state sequences may be fixed and pre-configured in some exemplary implementations. The beam state information $\beta(u)$ is thus known a priori and does not need to be detected.
2. Dynamically Scheduled Beam Sequence with Beam Sequence Decoding:
Beam state information $\beta(u)$ can be acquired by detecting and decoding downlink control information (DCI) or other control information which provides the beam index to symbol index mapping information. Beam scheduling information is typically signaled 1-20 sub-frames ahead thus decoding is typically performed in real-time substantially.

3. Dynamically Scheduled Beam Sequence with Sequence Information Signaled Through a Communication Interface:
A proprietary communication interface for testing purposes can be established between the DUT 105 and the test instrument 120 for providing beam state information $\beta(u)$.
Step 5.
The following calibration matrix is composed at time "u" by knowing the beam state information $\beta(u)$ and the weight vectors:

$$G(u) = \begin{bmatrix} g_{1b_1(u)} \\ \vdots \\ g_{Nb_N(u)} \end{bmatrix}^T \in \mathbb{C}^{K \times N} \tag{8}$$

The wireless channel emulator 115 constructs continuously over time "t" a MIMO channel impulse matrix to be convolved with the input signal vector X(t) as follows:

$$H'^{(t)} = G(u)H(t). \tag{9}$$

Step 6.
Wireless channel emulation and evaluation of performance characteristics of the DUT 105 can now be carried out. This may include one or more of various types of performance tests that may be performed by a conventional test system employing cables between a DUT and a test instrument.

Figure 5:
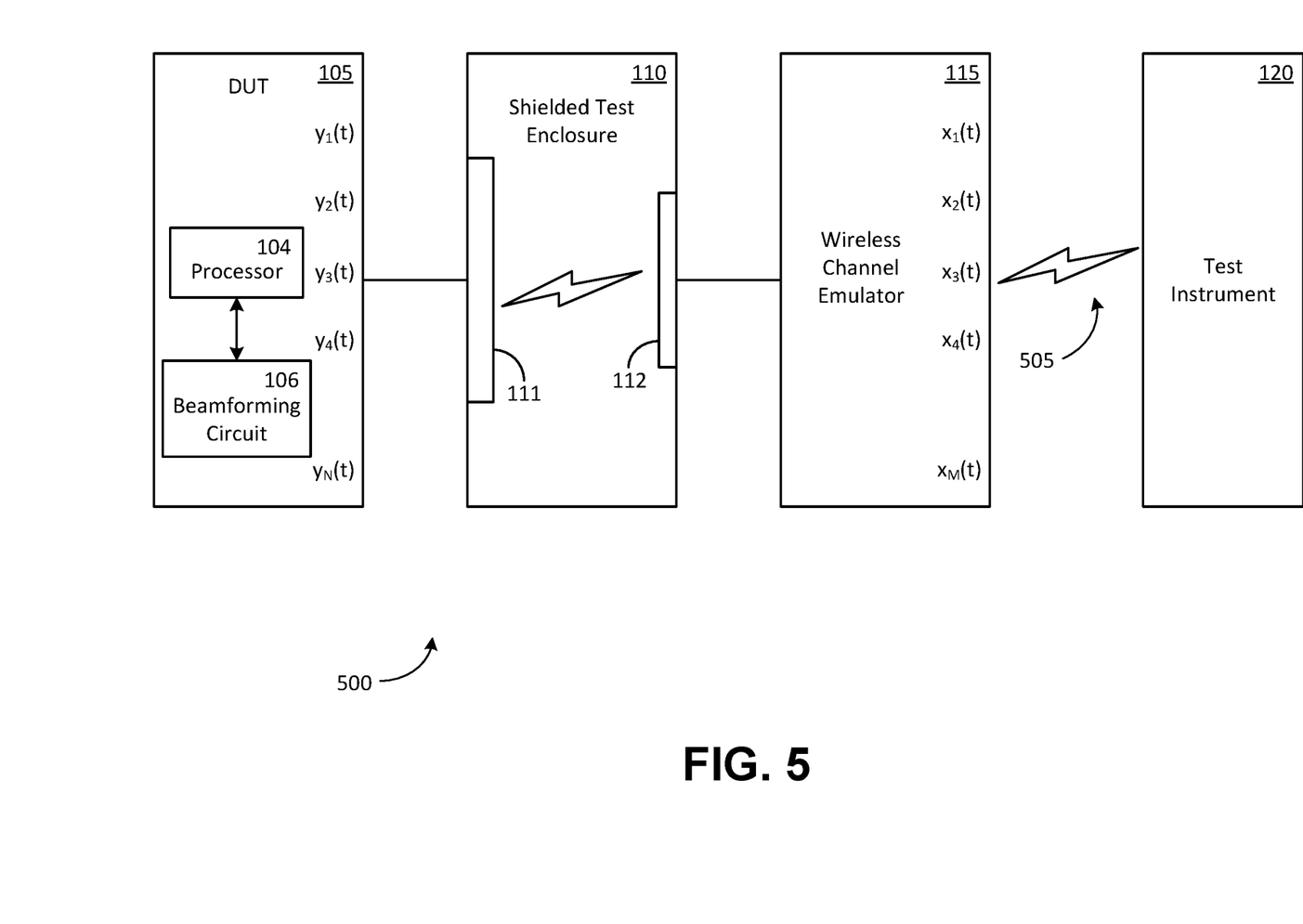
FIG. 5 shows another exemplary test system that includes a wireless channel emulator wirelessly coupled to a test instrument in accordance with another exemplary embodiment of the present disclosure.

FIG. 5 shows an exemplary test system 500 having the wireless channel emulator 115 wirelessly coupled to the test instrument 120 via one or more wireless communication links 505 in accordance with another exemplary embodiment of the present disclosure. The wireless coupling between the wireless channel emulator 115 and the test instrument 120 not only eliminates the need for interconnecting cables but also allows for the use of various types of test instruments that do not have RF connectors. Thus, in an exemplary test configuration, both the DUT 105 and the test instrument 120 can be devices lacking RF connectors.

Figure 6:
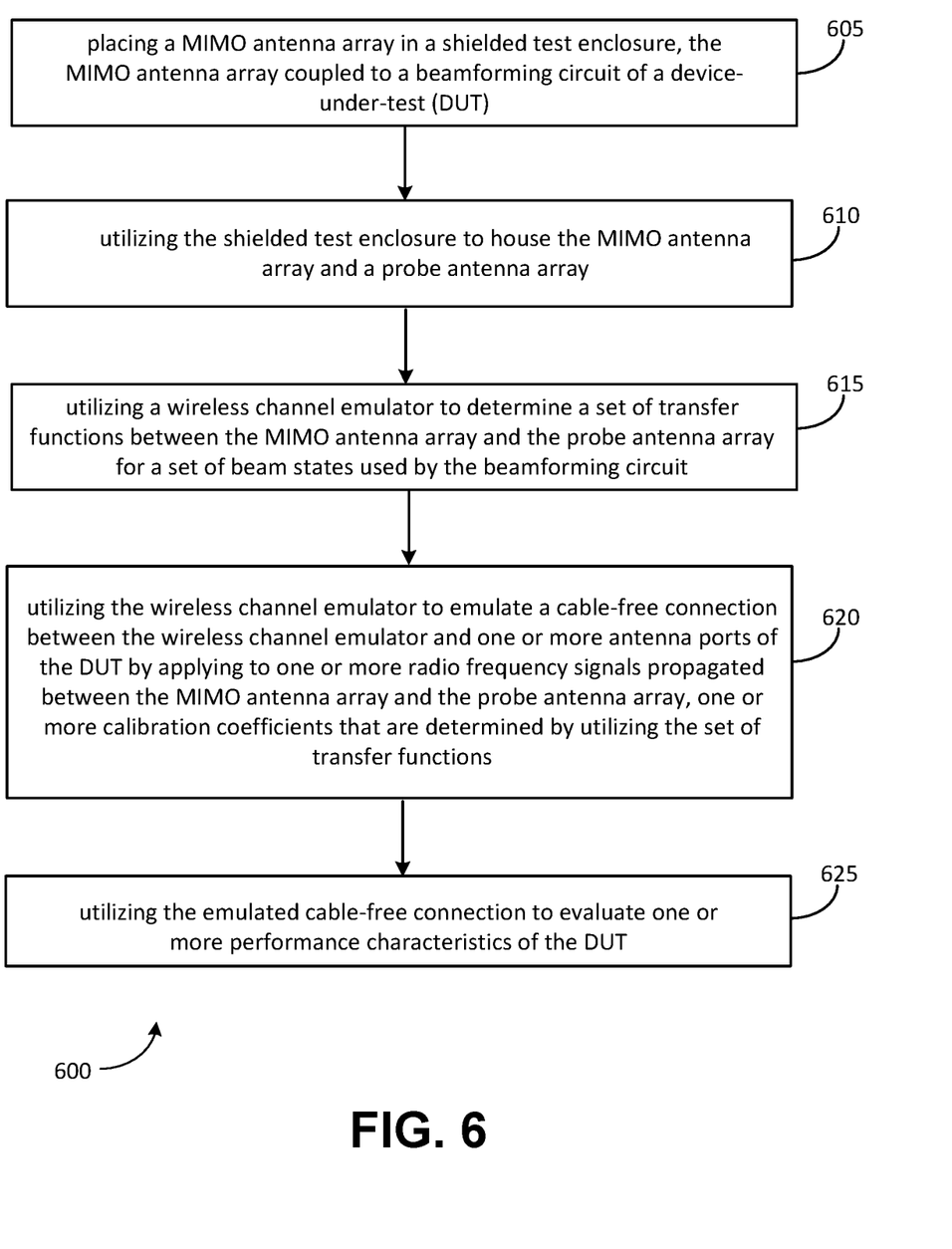
FIG. 6 shows an exemplary flowchart of a method to test a device having a beamforming circuit in accordance with an exemplary embodiment of the present disclosure.

FIG. 6 shows an exemplary flowchart 600 of a method to test a device having a beamforming circuit in accordance with an exemplary embodiment of the present disclosure.

Block 605 pertains to placing a MIMO antenna array in a shielded test enclosure, the MIMO antenna array coupled to a beamforming circuit of a DUT. This action is exemplified by placing MIMO antenna array 111 in the shielded test enclosure 110. The MIMO antenna array 111 is coupled to the beamforming circuit 106 of the DUT 105.

Block 610 pertains to utilizing the shielded test enclosure to house the MIMO antenna array and a probe antenna array. This action is exemplified by utilizing the shielded test enclosure 110 to house the MIMO antenna array 111 and the probe antenna array 112 located in the shielded test enclosure 110.

Block 615 pertains to utilizing a wireless channel emulator to determine a set of transfer functions between the MIMO antenna array and the probe antenna array for a set of beam states used by the beamforming circuit. This action is exemplified by utilizing the wireless channel emulator 115 to determine a set of transfer functions between the MIMO antenna array 111 and the probe antenna array 112 for a set of beam states used by the beamforming circuit 106. Determining the set of transfer functions may be carried out during execution of the exemplary transfer function measurement procedure and/or the exemplary DUT evaluation test procedure described above. In one exemplary implementation, the set of beam states is a maximum number of beam states used by the beamforming circuit 106. In one exemplary embodiment, the maximum number of beam states used by the beamforming circuit 106 corresponds to a maximum operating capacity of the beamforming circuit 106. In another exemplary embodiment, the maximum number of beam states used by the beamforming circuit 106 may be a preselected number of beam states "B" that may be defined by a user of the test system 100, for example.

The set of transfer functions can include a time-variant transfer function $F_{N \times K}(u)$ between the "K" antenna elements of the probe antenna array 112 and the "N" antenna elements of the MIMO antenna array 111.

Block 620 pertains to utilizing the wireless channel emulator to emulate a cable-free connection between the wireless channel emulator and one or more antenna ports of the DUT by applying to one or more radio frequency signals propagated between the MIMO antenna array and the probe antenna array, one or more calibration coefficients that are determined by utilizing the set of transfer functions. This action is exemplified by utilizing the wireless channel emulator 115 to emulate the cable-free connection by applying calibration coefficients to one or more radio frequency signals propagated between the MIMO antenna array 111 and the probe antenna array 112. The one or more calibration coefficients may be applied in real-time during execution of the exemplary transfer function measurement procedure and/or the exemplary DUT evaluation test procedure described above.

Block 625 pertains to utilizing the emulated cable-free connection to evaluate one or more performance characteristics of the DUT. This action is exemplified by utilizing the emulated cable-free connection to evaluate one or more performance characteristics of the DUT 105. Some exemplary performance characteristics of the DUT 105 are downlink performance and uplink performance such as signal characteristics and throughput.

The exemplary flowchart 600 can include additional steps such as acquiring beam state information to identify the set of beam states used by the beamforming circuit 106 in the DUT 105 for transmitting the test signals. Acquiring beam state information may include utilizing at least one of a known fixed beam sequence, a dynamically scheduled beam sequence with beam sequence decoding, or a dynamically scheduled beam sequence with sequence information signaled through a communication interface In summary, it should be noted that the invention has been described with reference to a few illustrative embodiments for the purpose of demonstrating the principles and concepts of the invention. It will be understood by persons of skill in the art, in view of the description provided herein, that the invention is not limited to these illustrative embodiments. Persons of skill in the art will understand that many such variations can be made to the illustrative embodiments without deviating from the scope of the invention.

What is claimed is:

1. A system comprising:
a probe antenna array;
a wireless channel emulator coupled to the probe antenna array, the wireless channel emulator being configured to emulate a cable-free connection between the wireless channel emulator and one or more antenna ports of the DUT by utilizing one fixed beam state per port for all time instants;
a device-under-test (DUT), comprising:
a beamforming circuit disposed in the DUT; and
a multiple input multiple output (MIMO) antenna array configured to transmit one or more radio frequency signals provided by the beamforming circuit;
a shielded test enclosure that provides a cable-free connection between the wireless channel emulator and one or more antenna ports of the DUT, the shielded test enclosure configured to house at least the MIMO antenna array and the probe antenna array, the probe antenna array arranged to receive the one or more radio frequency signals transmitted by the MIMO antenna array; and
a test instrument coupled to the wireless channel emulator, the test instrument configured to evaluate one or more performance characteristics of the DUT based on one or more beam states utilized by the beamforming circuit for transmitting the one or more radio frequency signals from the MIMO antenna array.

2. The system of claim 1, wherein the beamforming circuit is one of an analog beamforming circuit, a digital beamforming circuit, or a hybrid beamforming circuit.

3. The system of claim 2, wherein the test instrument is configured to identify the one or more beam states by evaluating the one or more radio frequency signals received by the probe antenna array from the MIMO antenna array.

4. The system of claim 2, wherein the wireless channel emulator is a fading emulator that at least in part, emulates the cable-free connection between the wireless channel emulator and the one or more antenna ports of the DUT.

5. The system of claim 4, wherein the fading emulator is configured to emulate the cable-free connection between the wireless channel emulator and the one or more antenna ports of the DUT by determining at least one transfer function between the MIMO antenna array and the probe antenna array.

6. The system of claim 4, wherein the fading emulator is configured to emulate the cable-free connection between the wireless channel emulator and the one or more antenna ports of the DUT by utilizing a time-variant transfer function and a calibration matrix.

7. The system of claim 6, wherein the fading emulator is configured to apply the calibration matrix to the one or more radio frequency signals, in real-time, based on the one or more beam states utilized by the beamforming circuit.

8. The system of claim 1, further comprising a processor disposed in the DUT and coupled to the beamforming circuit, the processor being adapted to configure the beamforming circuit to provide drive signals to the MIMO antenna array.

9. A method comprising:
placing a MIMO antenna array in a shielded test enclosure, the MIMO antenna array coupled to a beamforming circuit of a device-under-test (DUT), wherein the beamforming circuit is disposed in the DUT;
utilizing the shielded test enclosure to house the MIMO antenna array and a probe antenna array;
utilizing a wireless channel emulator to determine a set of transfer functions between the MIMO antenna array and the probe antenna array for a set of beam states used by the beamforming circuit, the wireless channel emulator emulating a cable-free connection between the wireless channel emulator and one or more antenna ports of the DUT by utilizing one fixed beam state per port for all time instants;
utilizing the wireless channel emulator to emulate a cable-free connection between the wireless channel emulator and one or more antenna ports of the DUT by applying to one or more radio frequency signals propagated between the MIMO antenna array and the probe antenna array, one or more calibration coefficients that are determined by utilizing the set of transfer functions; and utilizing the cable-free connection to evaluate one or more performance characteristics of the DUT.

10. The method of claim 9, wherein utilizing the cable-free connection to evaluate one or more performance characteristics of the DUT comprises evaluating at least one of a downlink performance or an uplink performance of the DUT.

11. The method of claim 9, wherein the one or more radio frequency signals propagated between the MIMO antenna array and the probe antenna array are test signals.

12. The method of claim 11, further comprising acquiring beam state information used by the DUT for transmitting the test signals.

13. The method of claim 12, wherein acquiring beam state information comprises utilizing at least one of a known fixed beam sequence, a dynamically scheduled beam sequence with beam sequence decoding, or a dynamically scheduled beam sequence with sequence information signaled through a communication interface.

14. The method of claim 9, wherein the set of transfer functions comprises a transfer function between one or more ports of the MIMO antenna array and the probe antenna array.

15. The method of claim 9, wherein utilizing the wireless channel emulator to emulate the cable-free connection between the wireless channel emulator and the one or more antenna ports of the DUT is carried out in real-time.

16. The method of claim 9, wherein a processor is disposed in the DUT and coupled to the beamforming circuit, and the method further comprises configuring the beamforming circuit with the processor and providing drive signals to the MIMO antenna array.

* * * * *